United States Patent
Lehmbeck et al.

(10) Patent No.: US 6,175,427 B1
(45) Date of Patent: Jan. 16, 2001

(54) SYSTEM AND METHOD OF TONAL CORRECTION OF INDEPENDENT REGIONS ON A COMPOUND DOCUMENT

(75) Inventors: Donald R. Lehmbeck, Penfield; Jeng-Nan Shiau, Webster; Leon C. Williams, Walworth, all of NY (US)

(73) Assignee: Xerox Corporation, Stamford, CT (US)

(*) Notice: Under 35 U.S.C. 154(b), the term of this patent shall be extended for 0 days.

(21) Appl. No.: 09/063,029

(22) Filed: Apr. 20, 1998

Related U.S. Application Data

(60) Provisional application No. 60/059,821, filed on Sep. 23, 1997.

(51) Int. Cl.[7] ............... G06T 5/40; G06K 9/34; H04N 1/407
(52) U.S. Cl. ............ 358/1.9; 358/455; 382/169; 382/171
(58) Field of Search ............ 358/1.9, 522, 521, 358/455, 456, 458, 298; 382/168, 170, 171, 173, 176, 205, 169

(56) References Cited

U.S. PATENT DOCUMENTS

| | | | |
|---|---|---|---|
| 4,495,522 | * 1/1985 | Matsunawa et al. | 358/457 |
| 5,347,374 | * 9/1994 | Fuss et al. | 382/173 |
| 5,357,352 | * 10/1994 | Eschbach et al. | 382/205 |
| 5,363,209 | * 11/1994 | Eschbach et al. | 382/176 |
| 5,371,615 | * 12/1994 | Eschbach et al. | 382/173 |
| 5,414,538 | * 5/1995 | Eschbach et al. | 382/168 |
| 5,450,217 | * 9/1995 | Eschbach et al. | 382/171 |
| 5,450,502 | * 9/1995 | Eschbach et al. | 382/168 |
| 5,581,370 | * 12/1996 | Fuss et al. | 382/170 |
| 5,596,654 | * 1/1997 | Tanaka et al. | 382/168 |
| 5,727,080 | * 3/1998 | Cox et al. | 358/1.9 |
| 5,949,907 | * 9/1999 | Raz et al. | 358/1.9 |

\* cited by examiner

*Primary Examiner*—Scott Rogers
(74) *Attorney, Agent, or Firm*—Michael J. Nickerson

(57) ABSTRACT

A system and method provides the necessary image information to enable tonal correction for independent regions of a compound document. A scanner scans an image and generates image data. A histogram circuit, connected to the scanner, generates histogram data from the image data for a predetermined number of regions corresponding to the image. A windowing circuit, operatively connected to the scanner and in parallel with the histogram circuit, generates a window corresponding to an independent area of the image that requires image enhancement and an association circuit associates corresponding histogram data with the generated window. The associated histogram data and window are used by an image enhancement process to modify the image data to provide a more desirable reproduction of the scanned image.

12 Claims, 5 Drawing Sheets

SYSTEM AND METHOD OF TONAL CORRECTION OF INDEPENDENT REGIONS ON A COMPOUND DOCUMENT

This patent application claims priority under 35 U.S.C. §119 to provisional patent application no. 60/059,821, filed on Sep. 23, 1997.

FIELD OF THE PRESENT INVENTION

The present invention is directed towards a system and method for correcting tonal reproduction curves (TRCs) for independent regions of a compound document. More particularly, the present invention is directed to a system and method which generates the correct TRCs using only a single scan of the compound document.

BACKGROUND OF THE PRESENT INVENTION

In the past, a typical application for copiers or scan-to-print image processing systems was to reproduce an input image as accurately as possible, i.e., render a copy. Thus, copies have been rendered as accurately as possible, flaws and all. However, as customers become more knowledgeable in their document reproduction requirements, they recognize that an exact copy is often not what they want. Instead, they would rather obtain the best possible document output. Until recently, image quality from the output of a copier or a scan-to-print system was directly related to the input document quality.

Image enhancement, as used herein, refers only to processes which improve the output quality of the image, and not to internal operations, necessitated by particular processor limitations. Thus, for example, changing TRC for better reproduction of an image is an enhancement operation. However, reducing the number of colors representing image to place an image into a particular file format, such as GIF files, or .BMP files, is not an enhancement operation.

Photography has long dealt with this issue. Analog filters and illumination variations can improve the appearance of pictures in the analog photographic process. Thus, for example, yellow filters enhance the appearance of white clouds against a blue sky in black and white images. Further, various electrophotographic devices, including digital copiers, can clean up and improve images by adjustment of threshold, filtering, or background suppression. Generally, these methods are manual methods which a user must select on an image by image basis. Unfortunately, the casual user is not skilled enough to perform these operations. The inability to perform image enhancement operations is exacerbated when additionally dealing with color controls.

Three possible choices are presented by the art in the area of image enhancement. In the first case, we can do nothing. Such a system is a stable system, in that it does no harm to an image. This is a common approach taken to reproduction. However, the output documents of such a system are sometimes not satisfactory to the ultimate customer.

In a second case of image enhancement, the image can always be processed. It turns out that an improvement can usually be made to an image if certain assumptions are made that are accurate for most cases. In an exceptionally large set of images, increasing contrast, sharpness, and/or color saturation, will improve the image. This model tends to produce better images, but the process is unstable, in that for multi-generation copying, increases in contrast, saturation, or sharpness are undesirable and ultimately lead to a severe image degradation. Further, the process may undesirably operate on those images which are good ones.

Accordingly, we arrive at our third case of image enhancement, a process of automated image enhancement which operates to vary images which are not perceived as good images, but does not operate on images which do not need to be improved.

Many improvements can be made to an image, including luminance enhancement (e.g. U.S. Pat. No 5,450,502); sharpness enhancement (e.g., U.S. Pat. No. 5,363,209); exposure adjustment (e.g. U.S. Pat. No. 5,414,538); color balance correction (e.g., U.S. Pat. No. 5,357,352, U.S. Pat. No. 5,371,615) or contrast enhancement (U.S. Pat. No. 5,581,370); color saturation correction (e.g. U.S. Pat. No. 5,450,217), etc. These processes can be used together in a predictive mode that does not require iterative processing (e.g. U.S. Pat. No. 5,347,374). Generally, these processing methods operate by modifying a set of tonal reproduction curves (TRCs). The output image is achieved by using TRCs, operating either on the luminance channel of an image expressed $LC_1C_2$ coordinates, or preferably on each channel in a color density space description of the image in Red-Green-Blue (RGB) coordinates. The entire contents of U.S. Pat. Nos. 5,450,502; 5,363,209; 5,414,538; 5,357,352; 5,371,615; 5,581,370; 5,450,217; and 5,347,374 are hereby incorporated by reference.

Moreover, automatic image enhancement must be selective in its application. For example, when processing a compound document, a document with independent regions such as graphics, text, halftones, photographs, etc., the image enhancement for one region may not necessarily be applicable to another region. Thus, the image enhancement routine must selectively apply one or more of the above noted correction processes to each independent region.

Conventionally, to determine the tonal correction for independent regions on compound documents, two separate scans of the document was required. More specifically, as illustrated in FIG. 2, the image would be initially scanned at step S1 and from the image data generated from this scan the desired image regions or windowing would be identified at step S2. Thus, upon the completion at step S2, the various windows or regions of the image being scanned will have been identified. Thereafter, at step S3, the image is scanned again and the image data generated therefrom is utilized in step S4 to generate histogram data for each identified region. In other words, conventionally, it took two scans of the image to generate the image regions and the histograms for each identified region.

After these two sets of data is generated, step S5 uses the information generated at step S2 and S4 to enhance the image data; i.e., create the tonal correction curve for the image data for that region so that the image data can be outputted at step S6. Thus, FIG. 2 illustrates a conventional automatic image enhancement routine for correcting tonal reproduction curves for independent regions on a compound image. Although the method described with respect to FIG. 2 produces a high quality image, this method and process negatively impacts the productivity of the reprographic system More specifically, by requiring two separate scans of the image to generate the window data and the histogram data, respectively, the automatic image enhancement routine impacts productivity by one-half. Therefore, it is desirable to achieve the automatic image enhancement improvement while eliminating any adverse impact upon productivity.

SUMMARY OF THE PRESENT INVENTION

One aspect of the present invention is a method for providing necessary image information to enable tonal correction for independent regions of a compound document. The method scans an image and generates image data; generates histogram data from the image data for a predetermined number of regions corresponding to the image; generates, during the generation of the histogram data, a window corresponding to an independent area of the image that requires image enhancement; and associates corresponding histogram data with the generated window.

A second aspect of the present invention is a system for providing necessary image information to enable tonal correction for independent regions of a compound document. The system includes a scanner to scan an image and generate image data; a histogram circuit, operatively connected to the scanner, to generate histogram data from the image data for a predetermined number of regions corresponding to the image; a windowing circuit, operatively connected to the scanner and in parallel with the histogram circuit, to generate a window corresponding to an independent area of the image that requires image enhancement; and an association circuit to associate corresponding histogram data with the generated window.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAIL DESCRIPTION OF THE PRESENT INVENTION

Figure 1:
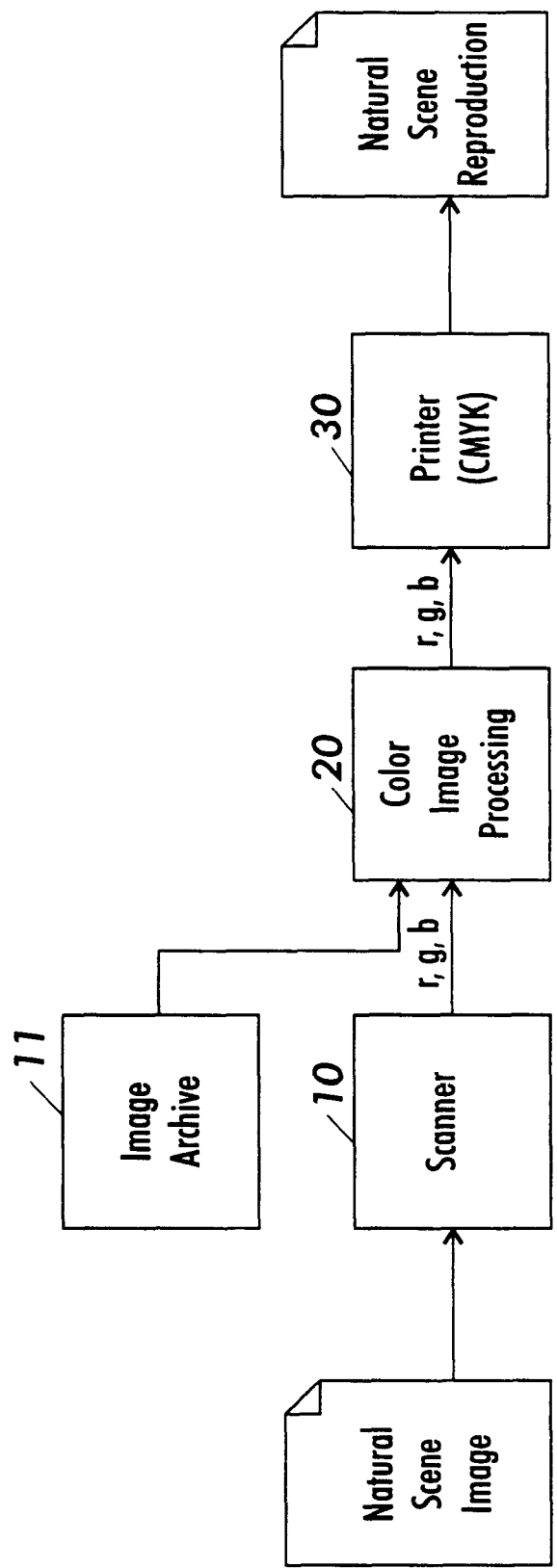
FIG. 1 is a block diagram illustrating an architecture of a conventional reprographic system.
Figure 2:
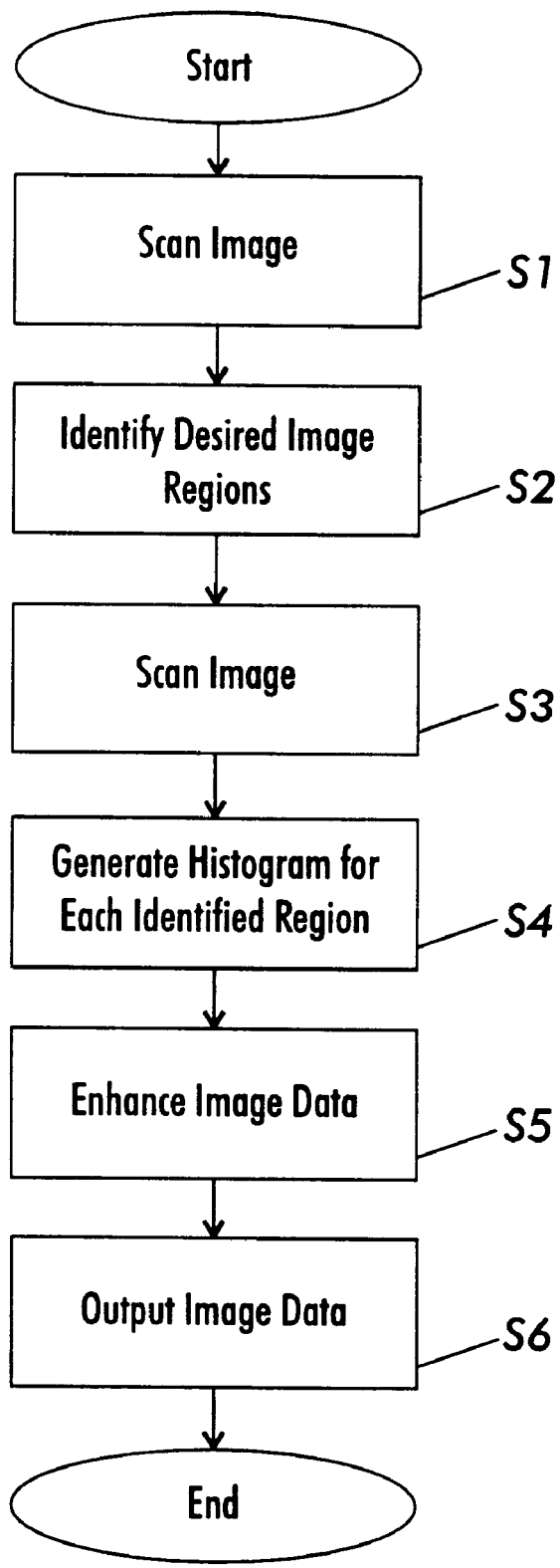
FIG. 2 is a flowchart showing a conventional method of establishing image enhancement for independent regions of a compound document.

The following will be a detailed description of the drawings illustrating the present invention. In this description, as well as in the drawings, like references represent like devices, circuits, or circuits performing equivalent functions.

FIG. 1 illustrates a scanner 10 which may conveniently be a black and white or color scanner which produces image signals defined in either RGB space for color images or density space for black and white images. Alternatively images may come from an image archive 11, where images are not necessarily idealized, and may represent unusual scenes or images. These images of concern are pictorial in nature, i.e., they represent "natural scenes", but they may be limited in their composition or may be problematic with their use. Included in this discussion are images used as "background" or "wallpaper" in computer displays. Another source of images are clipart archives, which represent large sets of inexpensively obtained images, which may not be readily available in an output that the user will like.

While certain computer generated imagery may qualify as representing nature scenes, the contemplated images are predominantly scanned photographs. The images themselves are defined in terms of pixels, wherein each pixel has a gray value which varies between a white level and a black level. In a currently desirable system, in which calculations may be done on 8 bits of information, 256 levels of gray will be available for use. When each separation in RGB space is used, this allows 24 bits of color, and over 16 million colors. Pixels are also identified in terms of position, i.e., a pixel defines a unique area within the image, identified by its position in a scan line, and the scan line position in a page. Color is therefore represented by triplets of gray pixels for each color pixel in the image, each triplet of gray pixel defining the color in each separation, which together form the color pixel.

Color may also be defined by an image file perhaps received from another source, using less than 256 levels of gray, and in some situations, allowing only 256 colors. Additionally, the number of describable colors/gray levels in an image is only the maximum number of possible colors and in a large number of cases, only a small subset of the allowed colors is actually used. This is often the case in images that are intended as background images, pictograms, etc. or in images that were intended for use on the World Wide Web.

The described color images may be directed to an automated image enhancement system which will be further defined herein. For our purposes, the automated image enhancement system may include a segmentation system which can identify within a document a type of image or image object, including pictorial and non-pictorial image areas or objects. It will be assumed that the output of the automated image enhancement system that is described herein will be directed to a printer, CRT, or like device. These devices may have many distinct characteristics and may be laser printers, or ink jet printers or LED displays or CRT displays. However, they have as a common requirement the representation of gray pictorial images. This may be done with gray printing or pseudo gray printing.

In terms of deriving data for operation by the present image enhancement system, a prescan may be performed on a document placed on a copying platen and scanned by the electro-optical system of the scanner to produce a signal representing the document image. Alternatively, the image may be directed to the automated image enhancement system from a memory, having previously been scanned or derived some other system, in which case, the received image is sampled as required. The prescan is optionally undersampled, i.e., the image need not be sampled at the ultimate resolution of the system for the purposes of enhancement. In practice, it has been determined that a relatively small number of pixels representative of and dispersed through the entire image can accurately represent the image for this purpose. In one particular embodiment, we use a block of pixels derived from the image, in approximately 512 pixels×512 pixels. The primary purpose of this selection is to improve the speed at which a software image enhancement system can process the pictorial images. Sampling at common image resolutions does not improve the results noted in the inventive process herein described significantly, and dramatically increases the software processing time required. Some embodiments of the described inventive process might decide not to undersample the image, e.g., when the input image size is actually small, or when a hardware acceleration is used.

The input image color signals are edited, or enhanced and prepared for printing at color image processing unit 20, which in FIG. 1 provides as an output r, g, b signals. Printer 30 receives the signal from color image processing unit 20, and provides for conversion of the signals to printer driver signals, commonly given in terms of the colorants that will be used in reproduction, typically Cyan, Magenta, Yellow and Key or black (CMYK). The printer has an output of the natural scene image, which, hopefully, matches user expectations of a "good" output image. Alternatively, the processed image from color image processing unit 20 is displayed on a television screen, CRT display or the like.

As noted above, automatic image enhancement must be selective in its application because not all documents are simple documents, but may be compound documents containing a plurality of independent regions that must be treated distinctly. Thus, the image enhancement routine must selectively apply one or more of the above noted correction processes to each independent region.

Conventionally, to determine the tonal correction for independent regions on compound documents, two separate scans of the document was required. Although such a method produces a high quality image, this method and process negatively impacts the productivity of the reprographic system. More specifically, by requiring two separate scans of the image to generate the window data and the histogram data, respectively, the automatic image enhancement routine impacts productivity by one-half. Therefore, it is desirable to achieve the automatic image enhancement improvement while eliminating any adverse impact upon productivity.

Figure 4:
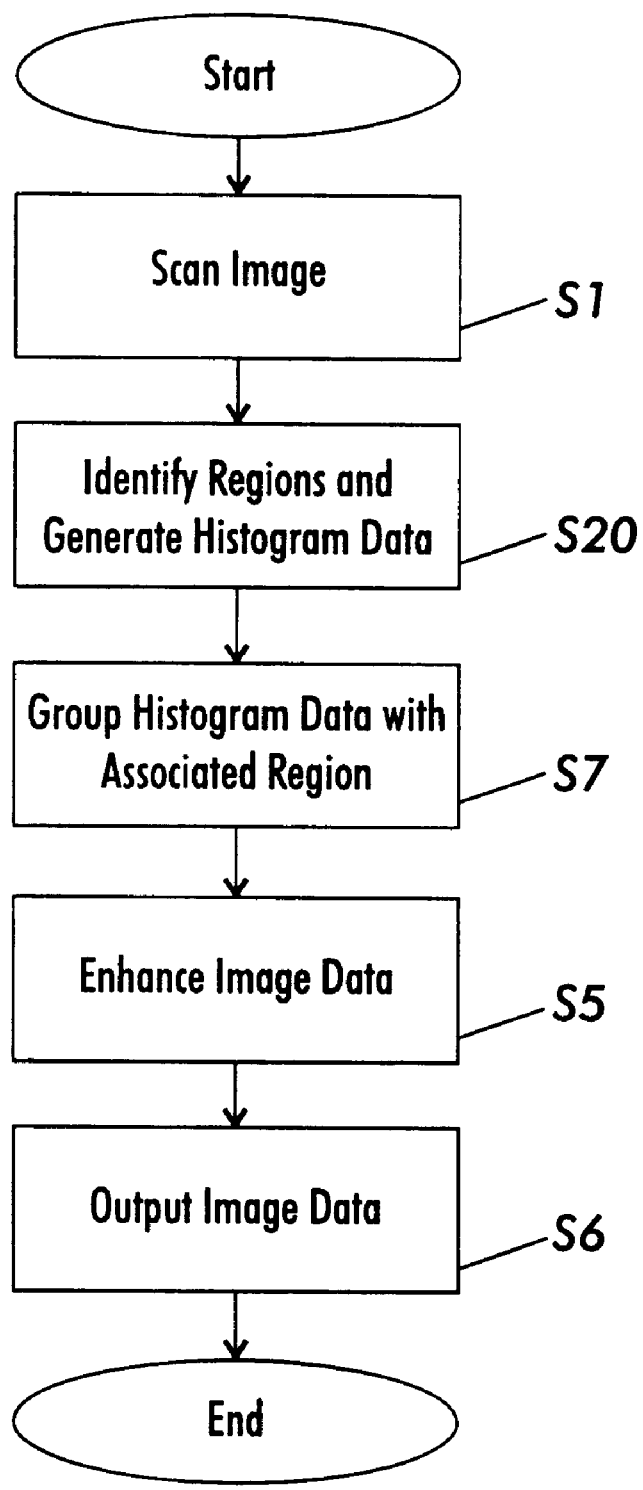
FIG. 4 is a flowchart showing a method of establishing image enhancement for independent regions of a compound document according to the concepts of the present invention.

FIG. 4 illustrates a method which realizes the benefits of automatic image enhancement while reduces the impact to productivity.

As illustrated in FIG. 4, the image is scanned once at step S1. The image data generated from this scan is fed into parallel paths one path which identify the regions of the compound document and the other path, at the same time, generates histogram data for the scanned in image. This parallel process is carried out at step S20. After the regions have been identified and the histogram data has been generated for the entire image in parallel, step S7 groups the particular histogram data with the associated region so that each identified independent region has grouped therewith it's histogram data. The group histogram data with the associated region is fed into the automatic image enhancement circuit or image processing circuit at step S5 so as to enhance the image data. This enhanced image data becomes the output image data for the reprographic system at step S6.

Figure 5:
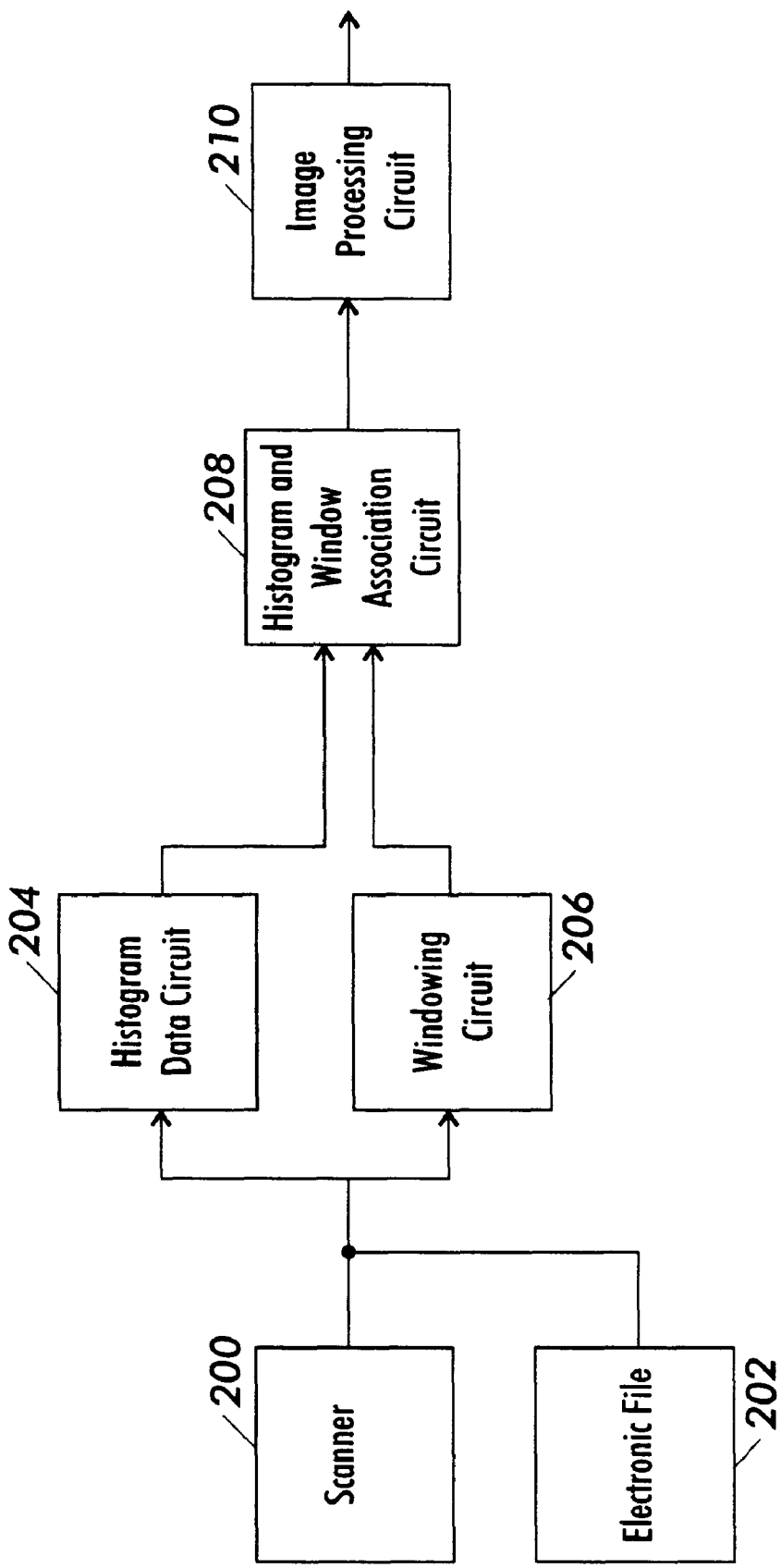
FIG. 5 is a block diagram illustrating an architecture for establishing image enhancement for independent regions of a compound document according to the concepts of the present invention.

FIG. 5 illustrates a basic architecture which realizes the benefits of automatic image enhancement while reducing the adverse effect on productivity. As illustrated in FIG. 5, a scanner 200 generates image data to be processed by the reprographic system This image data can also be retrieved from an electronic file 202. The image data is fed in parallel to a conventional histogram data circuit 204 and a conventional windowing circuit 206. The histogram data circuit 204 generates the histogram data for a predetermined number of regions which encompass the entire scanned image. In other words, the scanned image may be broken up into 24 regions and the histogram data for each region is generated. On the other hand, the windowing circuit 206 identifies the various regions in the compound document.

Both the histogram data from histogram data circuit 204 and the window information from windowing circuit 206 are fed into a histogram window association circuit 208 which associates the appropriate histogram data with a particular region so that the histogram and window association circuit 208 can output a set of histogram data for each identified region. In other words, the windowing circuit has broken up the image into a predetermined number of regions. For each of these window regions, the histogram window association circuit assigns the associated histogram data thereto. For example, if the histogram circuit has divided up the image into 24 regions, the windowing circuit may also divide the image up into 24 regions wherein each window has a corresponding histogram region. This information is fed into an image processing circuit 210 which enhances the image data prior to it being rendered by the reprographic system.

Figure 3:
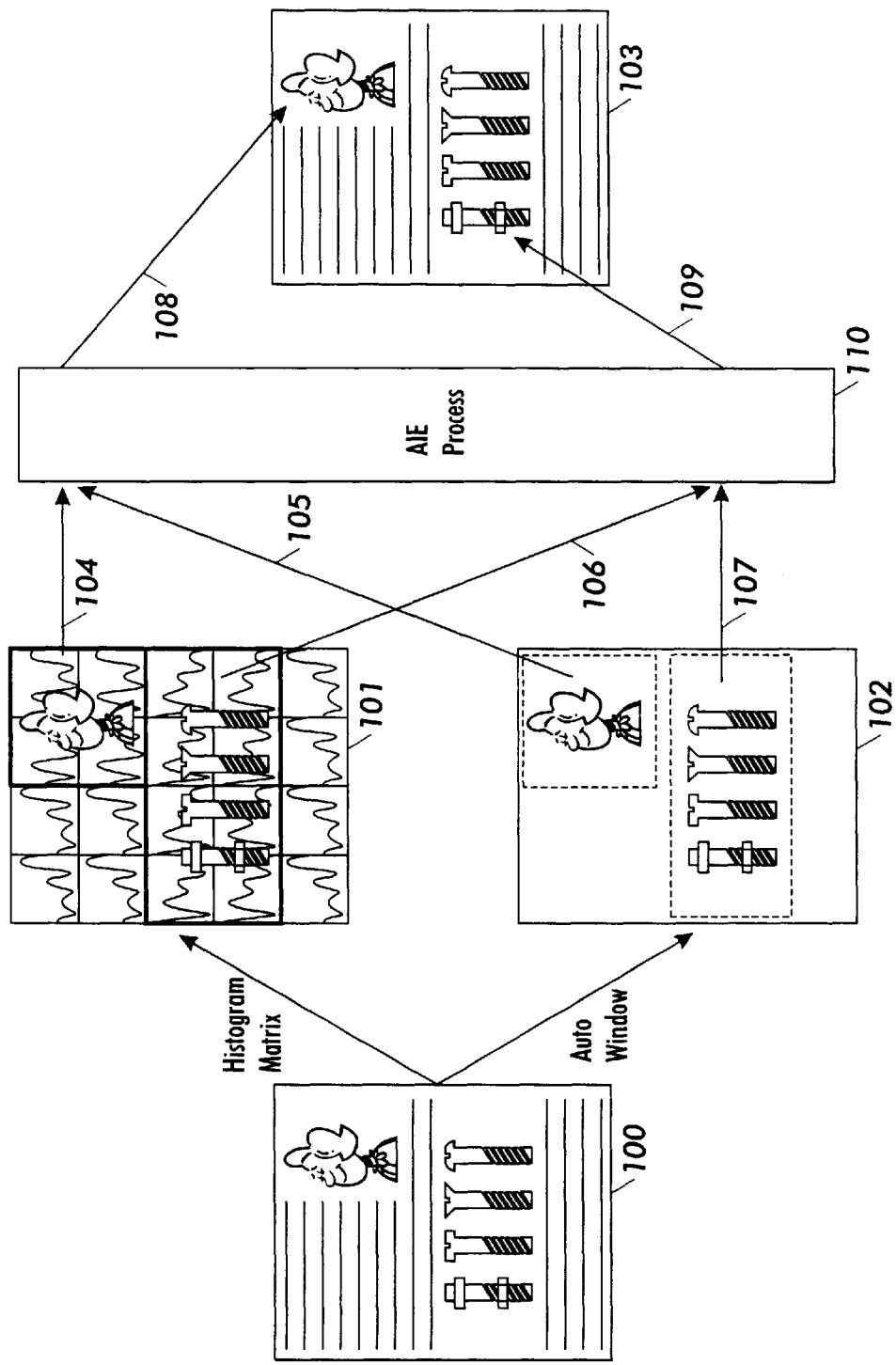
FIG. 3 shows a graphical representation of establishing image enhancement for independent regions of a compound document according to the concepts of the present invention.

FIG. 3 illustrates graphically an example of the concepts of the present invention. More specifically, as illustrated in FIG. 3, a compound document 100 is scanned by a scanner or is already stored as an electronic file on a network or in a external memory device. The image data associated with this compound document is fed in parallel to two separate circuits so that the histogram data can be generated in one circuit simultaneously with the generation of the window information by the other circuit.

As illustrated in FIG. 3, the histogram data circuit has divided the image into 20 regions and generated the histogram data for each region of the image 101. On the other hand, the windowing circuit identifies the various regions of the compound document 102. As illustrated in FIG. 3, the windowing circuit has identified two regions (105 and 107) that require image enhancement. After both sets of data are generated in this parallel process, the histogram data is associated with the appropriate window.

For example, as illustrated in FIG. 3, the histogram data of four regions 104 is associated with the window 105, while the histogram data of eight regions 106 is associated with the window 107. The windows 105 and 107 with their respective associated histogram data 104 and 106 are fed into an automatic image enhancement process circuit 110 which enhances the image data so as to produce output image data 108 and 109 that can be readily rendered by the reprographic system as an output image 103.

The present invention collects histograms at evenly spaced intervals at the same time a document is scanned for segmentation/windowing. Histogram elements corresponding to the window's locations can then be collected and input into an automatic image enhancement process so as to determine the tonal correction for each window. This process avoids scanning a document for windows and then re-scanning the document for histogram data within these particular windows. In other words, the present invention avoids the adverse impact to productivity by avoiding two separate scans of the document.

The size of the elemental histogram area can be as small as a halftone dot to enable extensions to image processing for granularity control to as large as a quarter of a page. Optimal size for tonal control in many office documents is a half inch square plus or minus a quarter inch.

It will no doubt be appreciated that the present invention may be accomplished with either software, hardware or combination software hardware implementations. The present invention has been described with reference to a particular embodiment. Modifications and alterations will occur to others upon reading and understanding this specification. It is intended that all such modifications and alterations are included insofar as they come within the scope of the appended claims or equivalents thereof.

What is claimed is:

1. A method for providing necessary image information to enable tonal correction for independent regions of a compound document, comprising the steps of:

(a) scanning an image and generating image data;

(b) generating a plurality of histogram data sets from the image data for a predetermined number of regions corresponding to the image, said predetermined number of regions being greater than one;

(c) generating, during the execution of said step (b), a window corresponding to an area independent of the generating of the plurality of histogram data sets, the area being a portion of the image that requires image enhancement; and (d) grouping histogram data sets that corresponds to regions that are located within the window generated in said step (c) so as to create a histogram data set for the independent area corresponding to the generated window.

2. The method as claimed in claim 1, further comprising the step of:

(e) image enhancing the image data associated with the window generated in said step (c) based on the grouped histogram data sets.

3. The method as claimed in claim 2, wherein said step (e) includes correcting tonal reproduction curves associated with the window.

4. The method as claimed in claim 1, wherein the histogram region corresponds to a quarter size of the entire image.

5. The method as claimed in claim 1, wherein the histogram region corresponds to a half inch block size.

6. The method as claimed in claim 1, wherein the histogram region corresponds to a size of a halftone dot.

7. A system for providing necessary image information to enable tonal correction for independent regions of a compound document, comprising:

a scanner to scan an image and generate image data;

a histogram circuit, operatively connected to said scanner, to generate a plurality of histogram data sets from the image data for a predetermined number of regions corresponding to the image, said predetermined number of regions being greater than one;

a windowing circuit, operatively connected to said scanner and in parallel with said histogram circuit, to generate a window corresponding to an area independent of the generating of the plurality of histogram data sets, the area being a portion of the image that requires image enhancement; and an association circuit to group histogram data sets that corresponds to regions that are located within the generated window so as to create a histogram data set for the independent area corresponding to the generated window.

8. The system as claimed in claim 7, further comprising:

an image enhancing circuit to image enhance the image data associated with the window based on the grouped histogram data sets.

9. The system as claimed in claim 8, wherein said image enhancement circuit includes a circuit to correct tonal reproduction curves associated with the window.

10. The system as claimed in claim 7, wherein the histogram region corresponds to a quarter size of the entire image.

11. The system as claimed in claim 7, wherein the histogram region corresponds to a a half inch block size.

12. The method as claimed in claim 7, wherein the histogram region corresponds to a size of a halftone dot.

* * * * *